C. B. TRESCOTT.
COOKING DEVICE.
APPLICATION FILED JUNE 4, 1907.
934,858.
Patented Sept. 21, 1909.
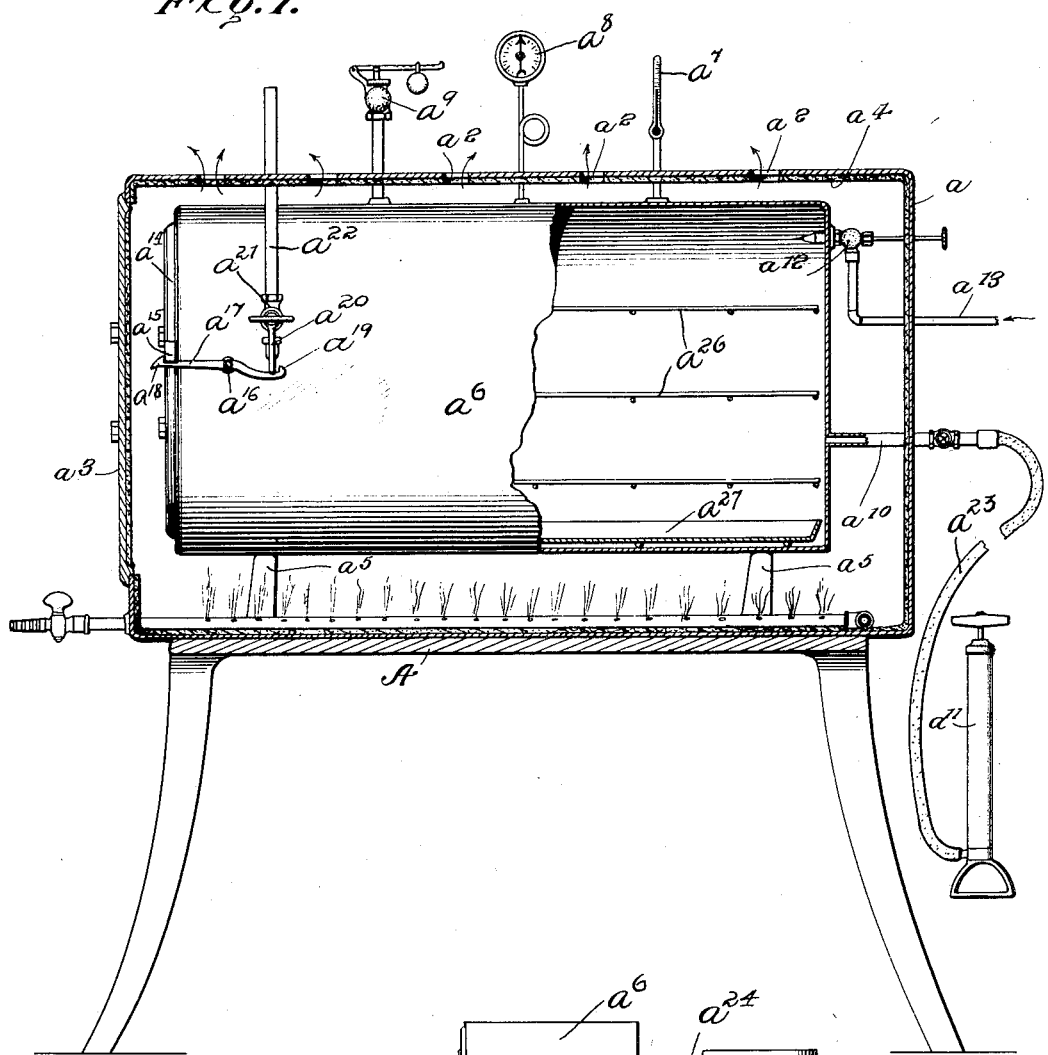
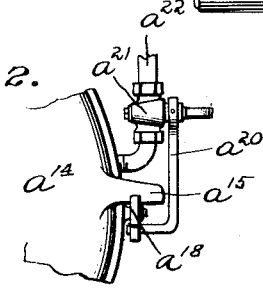
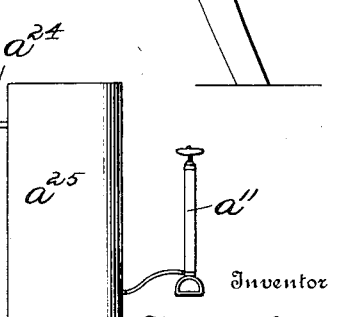
Witnesses
Inventor
Charles B. Trescott,
by:
Attorney

UNITED STATES PATENT OFFICE.

CHARLES B. TRESCOTT, OF SAN FRANCISCO, CALIFORNIA, ASSIGNOR TO SAMUEL ELMORE, OF ASTORIA, OREGON.

COOKING DEVICE.

934,858.  Specification of Letters Patent. Patented Sept. 21, 1909.

Application filed June 4, 1907. Serial No. 377,275.

*To all whom it may concern:*

Be it known that I, CHARLES B. TRESCOTT, a citizen of the United States, residing at San Francisco, in the county of San Francisco and State of California, have invented certain new and useful Improvements in Cooking Devices; and I do hereby declare the following to be a full, clear, and exact description of the invention, such as will enable others skilled in the art to which it appertains to make and use the same.

The object of this invention is to provide a device for cooking food matter, animal or vegetable, such as meats, fruits, vegetables, etc., thoroughly and evenly in a ready and expeditious manner, preserving the flavor of the matter and avoiding waste and loss of substance, while, at the same time, producing a superior product and saving heat.

In the usual devices for cooking meat, or the like, as at present practiced, especially in hotels or restaurants where meat is roasted in portions of great size, the outside has to be overcooked, that is burned or seared, in order to cook the interior, and even then the interior is not sufficiently cooked. And all animal food products, whether roasted or boiled, suffer loss in substance and in flavor,—as well as in most cases, induration—by excessive extravasation or exudation of their juices and the probable setting, that is, hardening of albuminous and other matter constituent of the product, owing to the high heat requisite, while in the case of fruits, for example, the high heat under the present methods employed either mars or utterly destroys the natural or desirable flavor. Heretofore food has been cooked under pressure, but always at a high heat.

The point of invention in the present device is cooking at a comparatively low heat, and this is effected by pressing heat units or increments, that is heat, in an aeriform medium or vehicle,—atmospheric air, carbonic acid, or other suitable aeriform fluid,— under pressure to the substance under treatment, whereby heat is concentrated and is caused to intrude into the interstices of the substance, subjecting it to an even and uniform cooking throughout, while, at once, in a great measure, preventing exudation of its juices and any hardening of its body, the comparatively small quantity of juices that may exude being beneficially saved for use. I have discovered that in food matters, such as meats, thus cooked, not only is there conservation of the desirable ingredients and characteristics of the products, and a greatly improved product, but they suffer but slight shrinkage, retain nearly all their juices, come out absolutely tender and of attractive color and have a far better flavor than those cooked by any device heretofore known or employed; and even at a comparatively low temperature, effecting a saving in fuel, together with rigid maintenance of requisite temperature with but slight accession of heat, the time of cooking is not only not increased beyond that incident to the devices now in use, but is, in some cases, diminished, that is, there is, in some cases, an absolute gain in time, while by my device the product is uniformly cooked and as fully and completely as may be desired, that is, to any degree desired. I ascribe the cooking effectually obtained at a low heat to the increase by pressure of the number of heat units in a given space, that is, in each space, cell or interstice where the effect of heat is to be manifest,—where heat is doing its work.

It will be understood, that I employ heat at a comparatively low temperature, that is, at a low temperature as compared with the temperature incident to the devices heretofore known or used by others. It is in this sense, that I use the expression "comparatively" in the claims to my invention here. Under usual circumstances, I may cook much below the ordinary cooking temperature of 212 degrees F., or more, say as low as 140 degrees or 145 degrees F., though this will of course, take a longer time; but even in cooking at a low temperature, I employ adequate pressure to convey the heat to the interior of the substance being cooked and largely to arrest exudation of the juices.

As an example of the application of my device, in cooking meats, 160 degrees F. (less or somewhat more) with twenty-five to thirty pounds of pressure per square inch (somewhat more or less) will produce good results. It is necessary that the chamber which I employ be absolutely closed to give pressure, and it being insulated against radiation, there is more conservation of heat so that the desirable degree having once been obtained, is maintained by an exceedingly small accession of heat. Moisture may be supplied in small quantities in any convenient manner and this moisture seems to aid as a vehicle for the heat.

Figure 1 is a view in side elevation, partly broken away and partly in section, of a device capable of carrying out the method of my invention; Fig. 2 is a fragmentary detached detail view of the oven door and the means for relieving the air-pressure within the oven before the door is opened; and Fig. 3 is the detail view of an oven, compressed-air reservoir, and air-pressure pump.

Referring to the drawings in detail, A designates a source of heat supply, such as an ordinary gas-range, or the like, on which is supported or carried an inclosed chamber $a$, necessarily perforated, as at $a^2$, and having a door $a^3$, and desirably insulated, as at $a^4$. Supported within the chamber $a$, as by legs $a^5$, is an oven $a^6$, preferably out of contact at all points with said chamber and necessarily, for my purpose, air-tight and desirably, for the purposes of strength, formed of steel.

The oven is provided with a door $a^{14}$, having a nose $a^{15}$. Pivotally secured to the oven-casing, as at $a^{16}$, is a rod $a^{17}$, having at the outer end, catch $a^{18}$ adapted to engage with the nose $a^{15}$ and, toward the inner end with a curved portion $a^{19}$ adapted liftingly to engage with the lower extremity of an operating-lever $a^{20}$ of a valve $a^{21}$ on an air-escape pipe $a^{22}$ communicating with the interior of the oven $a^6$ and with the exterior atmosphere. It will be noted that, before the door can be opened, the rod $a^{17}$ has to be depressed, or rocked downward on its pivot, to release the catch $a^{18}$ from engagement with the nose $a^{15}$. Simultaneously, the inner end portion of the rod $a^{17}$ raises the lever $a^{20}$, which operates to open the valve $a^{21}$, thereby to relieve the air-pressure within the chamber. If no such means as has just been described were provided, the door might be thoughtlessly opened by an operator while air-pressure was within the oven, and the door flying open and the outrush of air would likely seriously injure him.

Communicating with the oven are any desired or well-known forms of thermometer $a^7$, pressure-gage $a^8$, and safety or blow-off valve $a^9$; all arranged and operating in the well-known manner and subserving the customary functions of such parts, wherefore detailed illustration of description of these parts is deemed superfluous. Also communicating with the oven is a pipe $a^{10}$, on the outer end of which is adapted to engage rubber tubing $a^{23}$, or the like, of a means for compressing the air in the oven, such as an ordinary air-pressure pump $a^{11}$.

In practice, it is desirable, as shown in Fig. 3, to have the oven $a^6$ communicate by valve pipe $a^{24}$ with a compressed-air-reservoir $a^{25}$, and to compress the air in the reservoir the air-pressure pump $a^{11}$ may be used.

In order to supply a proper amount of moisture to the oven, I may employ a needle-valve $a^{12}$, to which steam is conveyed through a pipe $a^{13}$ communicating with any suitable source of steam supply (not shown) where the pressure is greater than that of compressed air. In smaller ovens, where not so much moisture is needed, it is sufficient to place some water in the oven, for which purpose the pan $a^{27}$ may be provided. This pan is also utilized to catch whatever drippings there may be from the substance.

Within the oven are adapted to be disposed, as on wire-racks $a^{26}$, or the like, the articles of food matter to be cooked. The air is compressed in the oven and, exerting pressure upon the food-matter therein, immediately causes the heat to permeate the food-matter, whereby there is a uniformity of presentment of heat to all parts thereof and by pressure from without setting against the juices, maintains these within the product. The result is that every portion of the food, the center as well as the outside, is equally cooked, the flavor and aroma are preserved, and the product is rendered tender and has lost little weight.

It will be obvious that the pressure should be to a point of preventing production of steam and also to a point to overcome the expansion of the food-matter under the action of the heat.

I claim:—

1. A device for treating and conserving food matter, including a substantially air-tight oven, and means for supplying a comparatively small amount of heat thereto in an aeriform vehicle under pressure.

2. A device for treating and conserving food matter, including a substantially air-tight oven, and means for supplying a comparatively small amount of heat thereto in a moistened aeriform vehicle under pressure.

3. A device for treating and conserving food matter, including a substantially air-tight oven, means for supplying heat units thereto of comparatively low temperature, and instrumentalities for concentrating said heat units by pressure.

In testimony whereof, I affix my signature, in the presence of two subscribing witnesses.

CHARLES B. TRESCOTT.

Witnesses:
R. G. DYRENFORTH,
E. S. BRANDENBURG.